Sept. 5, 1961　　　A. G. FRITZ ET AL　　　2,998,950
INTEGRATED PARACHUTE DEPLOYMENT PACK
Filed July 2, 1959　　　　　　　　　　6 Sheets-Sheet 1
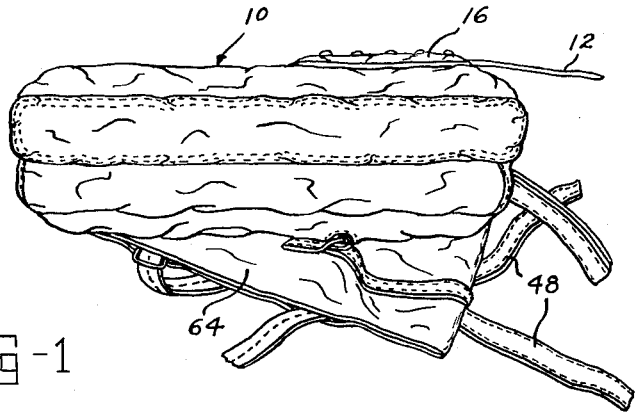
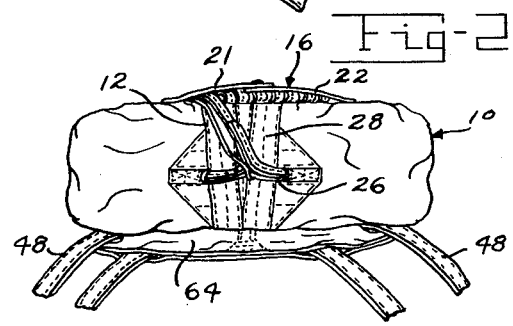
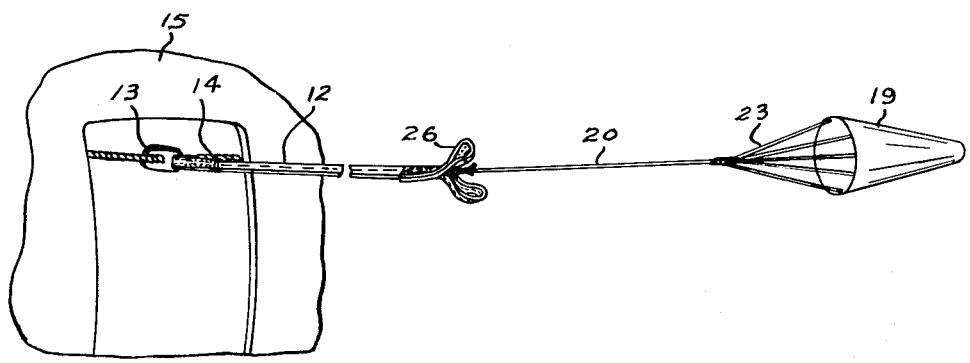
INVENTORS
ALFRED G. FRITZ
ALPHONS P. WEBER
ROBERT L. OAKLEY
BY
ATTORNEYS

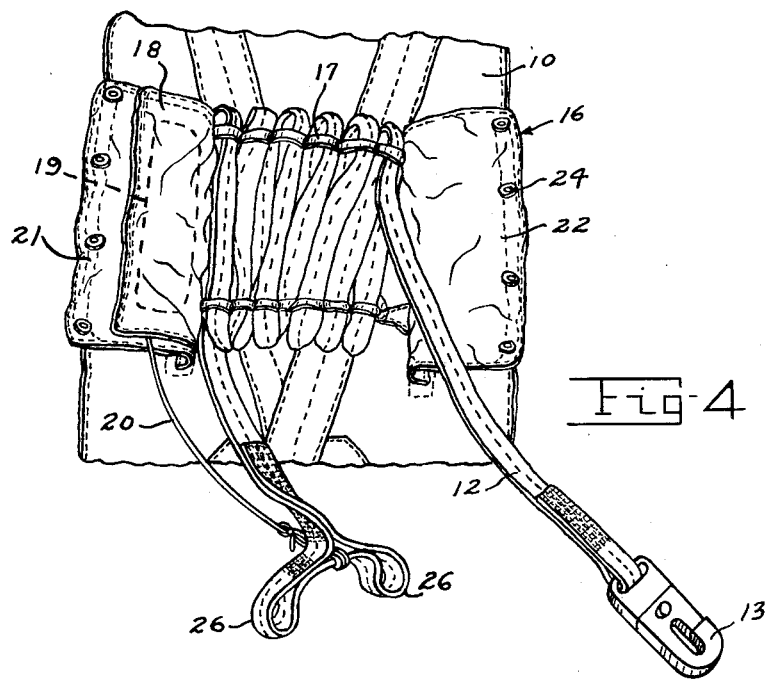
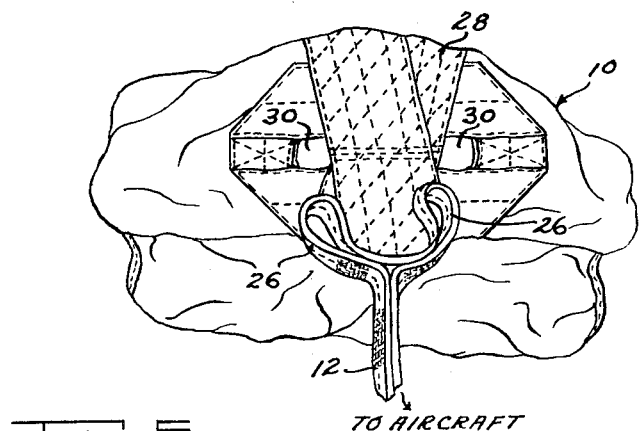

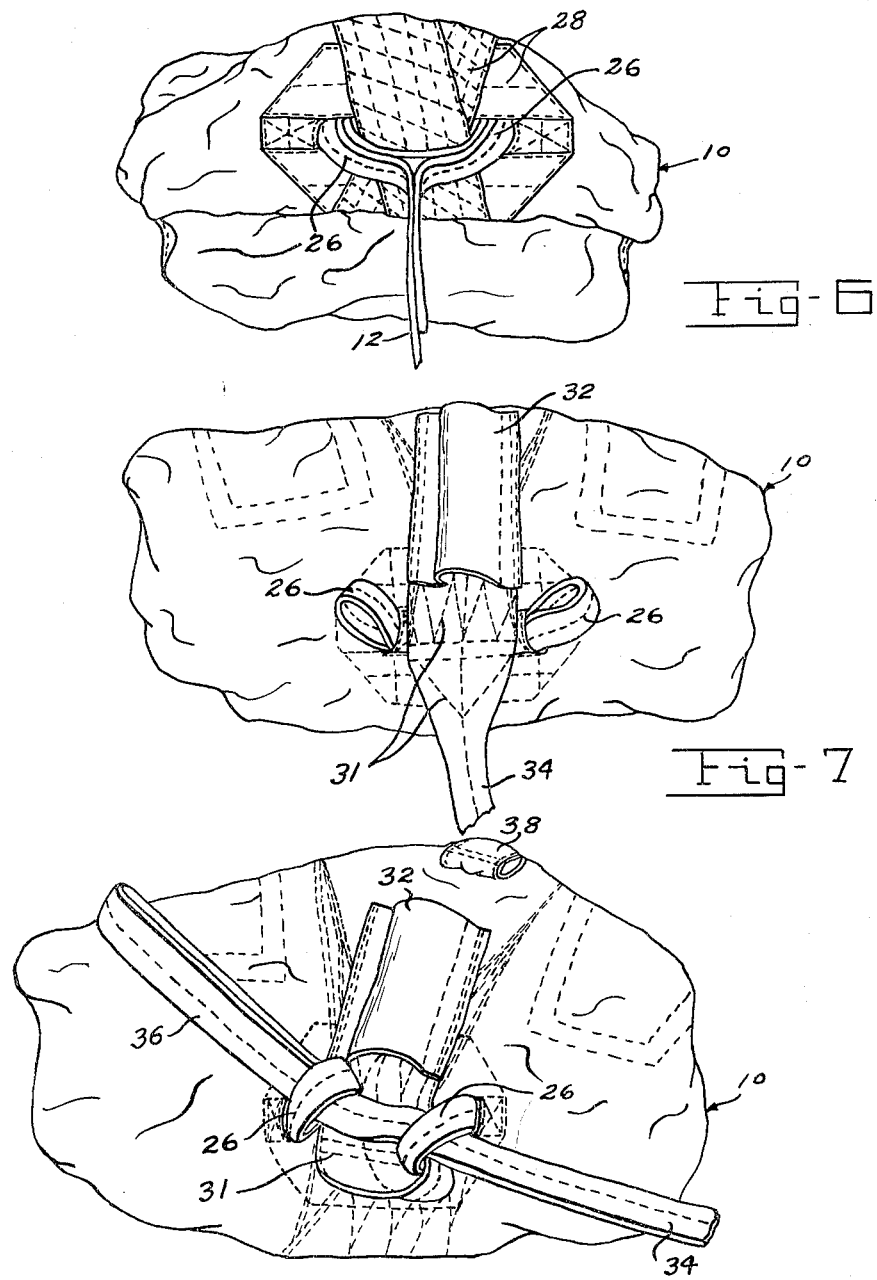

Sept. 5, 1961      A. G. FRITZ ET AL      2,998,950
INTEGRATED PARACHUTE DEPLOYMENT PACK
Filed July 2, 1959
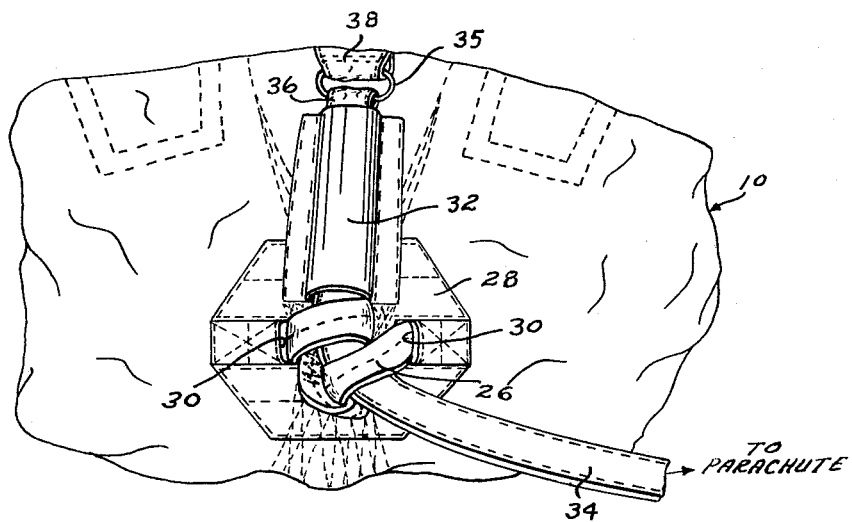
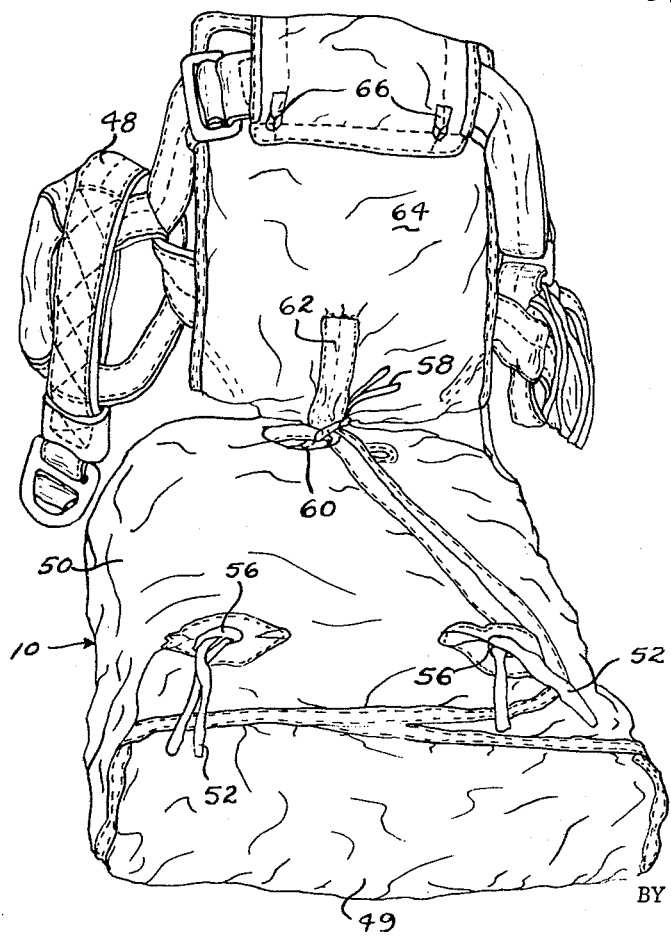

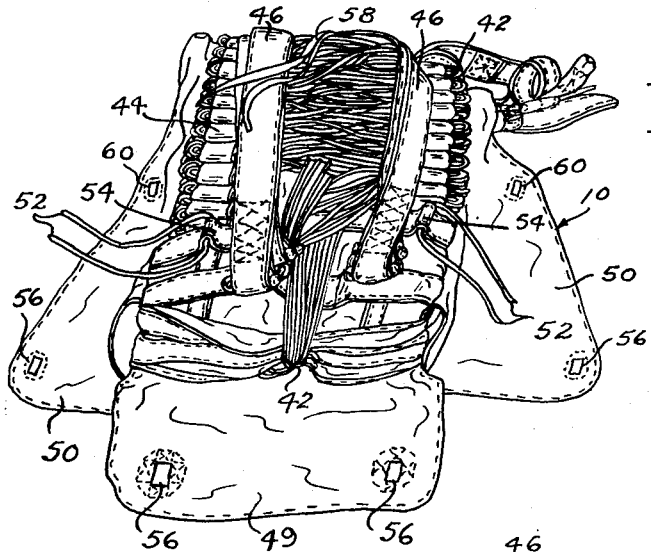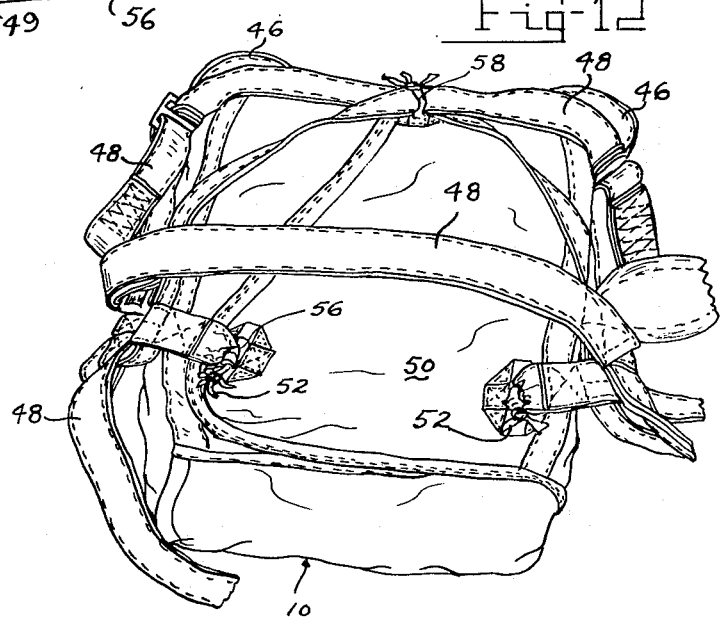

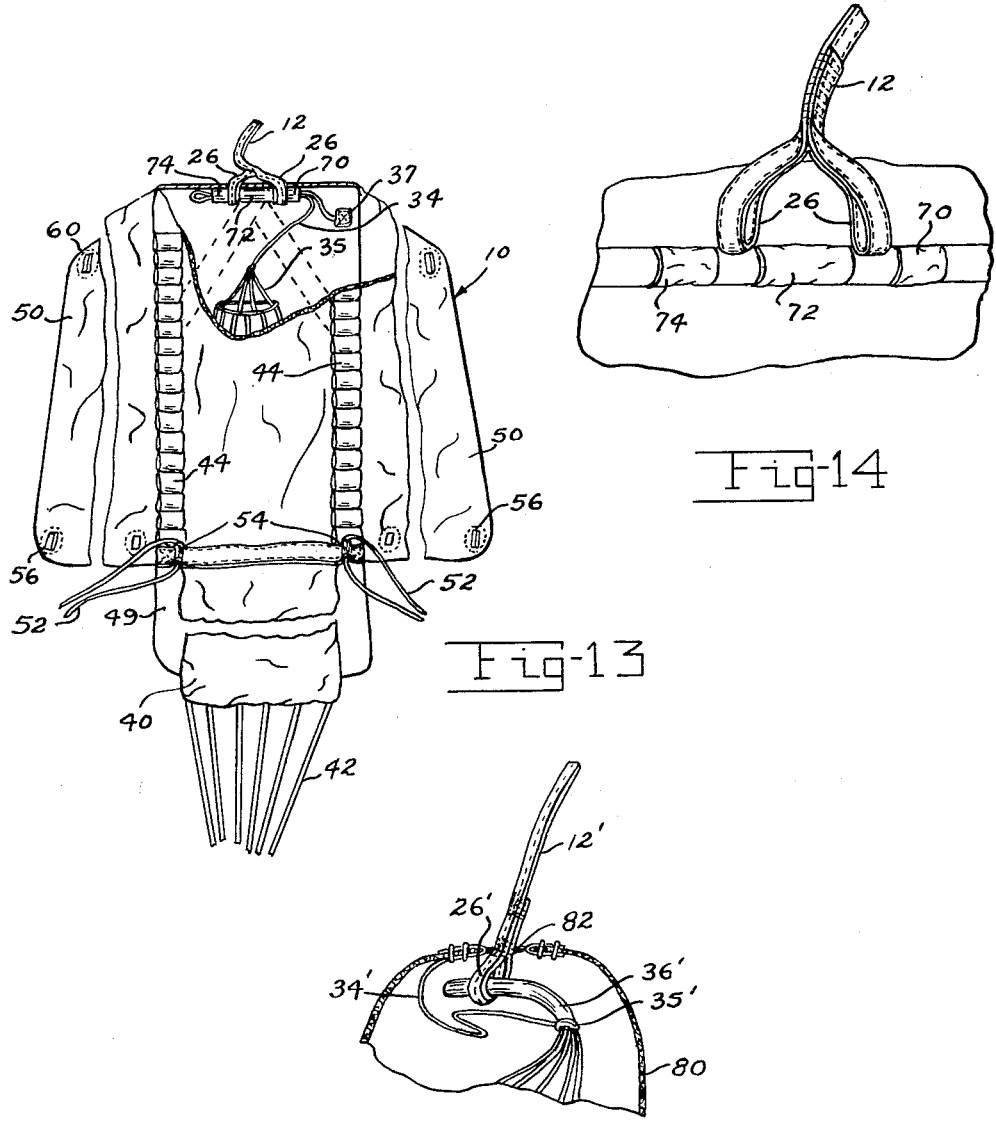

United States Patent Office 2,998,950
Patented Sept. 5, 1961

2,998,950
INTEGRATED PARACHUTE DEPLOYMENT PACK
Alfred G. Fritz, 1800 Belmont Lane, Redondo Beach, Calif., Alphons P. Weber, 1325 Mayapple Ave., Dayton 32, Ohio, and Robert L. Oakley, Yuma Test Station, Ariz.
Filed July 2, 1959, Ser. No. 824,753
9 Claims. (Cl. 244—148)
(Granted under Title 35, U.S. Code (1952), sec. 266)

The invention described herein may be manufactured and used by or for the United States Government for governmental purposes without payment to us of any royalty thereon.

This invention relates to an integrated or unified parachute deployment pack which provides a device less complicated and lighter in weight than the packs now in use and one in which the jumper is freed from the parachute pack after the deployment operation has been completed.

In the devices now in use and referring here particularly to the two-piece T-10 system, an outer pack and an inner pack deployment bag are used. The standard outer parachute pack contains a completely packed parachute within a parachute deployment bag upon which the shroud lines are stowed and from which they are deployed. The outer pack serves the purpose of an enclosing casing for the whole parachute and any devices employed for parachute deployment. The parachute pack is attached to the harness of the jumper, is worn by the parachutist and remains on his back during his descent. This is cumbersome to the wearer and is an impediment to him after his landing. Due to the intricate character of these devices, accidents can occur due to faults in manufacturing and mistakes in packing. In other devices, the parachute deployment bag was retained on the static line, endangering other parachutists jumping in rapid succession.

The object of the present invention is the integration of all of the elements of the outer pack and inner deployment bag into a single casing, hereafter referred to as a deployment pack or deployment pack casing, which performs the double function of stowing the parachute and suspension lines, and deploying them in orderly and successful fashion, greatly increasing safety and reducing hazards.

A further object of the invention is the provision of a parachute deployment pack which is completely severed from the back of the jumper during his descent, so that he is not encumbered by it during his descent and after he has landed; and further providing a device wherein the parachute deployment pack is separated from the static line at the point of completion of the deployment of the parachute.

The essence of the invention lies in the unique manner in which the static line is secured, both to the deployment pack and to the apex line of the parachute, and the manner in which it is released from both of these elements when the shroud lines and parachute canopy have been completely deployed. In the device as presented in the present invention, the parachute pack may either retain permanent connection with the parachute, and descend with it, or it may be freed from the canopy at the same time it is freed from the static line, and be jettisoned.

Due to the simplification of the device, it is much lighter in weight and much more economically manufactured than previously designed devices.

A still further object of the invention is the provision of a new device for removing the static line from interference areas once the parachute is freed from it.

Further objects and advantages will become apparent as the description proceeds.

In the drawings:

FIG. 1 is a side elevation of the deployment pack showing the jumper's back pad and segments of harness attached on the inward side, and the static line compartment in closed position on the outward side.

FIG. 2 is an outside upper end view of the pack showing the releasable device in attached position, and showing portions of harness broken away.

FIG. 3 is a schematic view of a static line stabilizing device, for removing the static line from interference area after release has taken place.

FIG. 4 is a fragmentary elevational view of a portion of the outward side of the deployment pack showing the static line stowed and the static line compartment open.

FIGS. 5-9, inclusive, show the successive steps of securing the static line to the deployment pack and to the apex line of the canopy, and locking it.

FIGS. 5 and 6 are outside views of the locking device.

FIGS. 7 and 8 are inside views.

FIG. 9 is an inside view showing the locking device completed.

FIG. 10 is a perspective top and side view of the closed deployment pack showing the jumper's back pad partially attached thereto.

FIG. 11 is a view of the deployment pack showing the canopy, suspension lines and risers stowed and showing the packing flaps unclosed.

FIG. 12 is a view of the outward side of the parachute pack in closed state and ready to be attached to the jumper's back. In this view the pack is frangibly attached directly to the jumper's harness, without the intervening back pad.

FIG. 13 is a schematic view of the opened parachute pack with portions broken away to show a modified static line connection to parachute pack and apex cable.

FIG. 14 is a detail showing of the modified channel or flute members and the static line unattached.

FIG. 15 is a still further modified form of attachment of the static line to the parachute pack and apex line of a parachute.

Referring more in detail to the drawings, a single integrated parachute pack and deployment bag casing is indicated generally by the numeral 10 and will be referred to as a deployment pack or casing. The parachute canopy is stowed within the casing 10. A static line 12 is provided with an upper hook 13 by which it is secured to the aircraft anchor cable 14 or other device carried by the aircraft 15 (see FIG. 3). The static line 12 is stowed within a compartment 16 which is carried, as worn by the jumper, on the outward wall of the pack 10, as shown in FIGS. 1, 2 and 4. The compartment is comprised of fluted static line stowing loops 17, a compartment 18 for stowing a stabilizer 19 and a pair of closing flaps 21 and 22.

The stabilizer 19, shown stowed in dotted lines in FIG. 4, and in operation in FIG. 3 is a bucket-shaped device, secured to the static line by a line 20, and the plurality of lines 23 secured to the bucket 19 at intervals around its open edge. The function of the bucket 19 is to catch into the air currents and sweep the static line out of the area of interference, where, otherwise it would dangle about, endanger the descending parachutist, or become entangled in the gear of other jumpers.

The flaps 21 and 22 of stowing compartment 16 are secured over the stowed static line and fastened by snap fasteners 24 or other expedient means. The outer end of the static line is provided with a pair of loops 26, whose duty is to provide one element of a locking means which secures the static line to the deployment pack and to the parachute until the proper moment arrives for its release. Suitable reinforcements 28 provide location for a pair of openings 30, designed to receive the loops 26.

The adjustment of the lock in locking position is the first step of packing of the parachute and is done before packing of the parachute canopy and suspension lines. The apex of the canopy is first drawn into the casing 10 which forms the canopy stowing compartment. FIGS. 5 to 9 inclusive show the successive steps of adjustment of the elements of the lock. FIGS. 5 and 6 are exterior views of the upper end of the deployment pack and FIGS. 7, 8 and 9 show the device as viewed from the inside looking upward.

A fluted portion, or extended channel 32 is sewed or otherwise secured to the inside of the pack casing 10. A line or apex cable 34 is secured to the apex of the parachute. FIG. 13 shows this connection in the form of a plurality of apex lines 33 connecting the periphery of the apex opening to the apex cable 34. The inner end of the cable 34 is shown in FIGS. 7 and 8 attached to the pack casing 10, by a stitching 31. FIG. 13 shows another form of fastening the cable 34 and FIG. 15 shows still another. This fastening may be omitted altogether. Whether it is fastened or left free depends upon whether the pack is to be jettisoned, or whether it is intended to remain with the parachute and descend with it.

The line 34 is looped at 36 and drawn through the inwardly protruding loops 26, and is then inserted through the flute 32. It may or may not be further secured by a frangible tie 35, tied into a permanent tab loop 38 in the interior of the casing 10. See FIGS. 8 and 9. After this adjustment has been made, the parachute skirt or canopy 40, and suspension lines 42 are stowed inside the pack casing 10. It is to be noted that the pack casing 10 with its end flap 49 and side flaps 50 is capable of being laid out in substantially flat condition. The packer is thus enabled to arrange each fold of the skirt and loop of the suspension lines while working on a plane surface, thus simplifying and expediting the adjustment of the lock, above described, and the correct arrangement and stowing of parachute canopy and suspension lines.

FIG. 12 shows the suspension lines 42 gathered parallel and looped through successive flutes or loops 44, located on the exterior of the inward wall of the casing. The risers 46, which form the permanent connection between the suspension lines 42 and the jumper's harness 48 are shown folded inside the pack. Frangible ties 52 originate from tabs 54 which are permanent elements of the pack casing. The ties 52 are drawn through mating openings 56 in the folded end and side flaps 49 and 50, and the tie 58 is drawn through opening 60. The tie 58 is secured to the tab loop 62 located in the top portion of the jumper's back pad 64. The ties 52 are tied to the tab loops 66 located in the lower portion of the jumper's back pad 64. The back pad 64 may or may not be used. When it is not used the frangible ties 52 are secured directly to the jumper's harness 48 as shown in FIG. 12.

When the jump is made, deployment takes place as follows: The weight of the jumper pulling on the static line withdraws the static line from the flutes 17, extending it to its entire length. The jumper's weight now snaps the frangible tacks 52 and 58 thus freeing the pack from the jumper's body. The deployment pack is held by the static line and moves away with the plane. The weight is now thrown onto the risers which are attached to the suspension lines, and the suspension lines begin their deployment from the loops 44. After the suspension lines are completely deployed, i.e., after the last stowed loop of suspension line has escaped from its stowing flute 44, then the smooth deployment of the canopy skirt begins. During all of this interval the jumper has maintained connection with the static line. It is not until the parachute canopy has been completely deployed that the weight of the system is brought to the elements of the locking device, i.e., the loop 36 of the apex line 34, and the loops 26 of the static line. As the weight falls on the line 34, the frangible tie 38 is broken, the loop 36 is withdrawn from the flute 32 and the loops 26, and the apex canopy cable is released from the static line.

If the line 34 is attached to the casing 10 by permanent means, then the parachute deployment pack remains attached to the canopy, and descends with it. If the line 34 is left free, the pack is jettisoned.

In the form of the invention shown in FIGS. 14 and 15, the construction of the static line remains the same as that described above, i.e., it is divided at its outer end and is provided with a pair of loops 26. The construction of the pack 10 is also the same, it being provided with side flaps 50 and end flap 49, stow line loops 44, tabs 54 and frangible ties 52. The modification lies in the segmented construction of the flute. As above described, this flute shown at 32 is a single member. In this modification, it is three separate members 70, 72 and 74. These flute sections are so spaced that the loops 26 may enter the spaces between them and form a continuous channel through which the loop or fold 36 is inserted. It enters first, the segment 70 then a loop 26, then the segment 72, then the other loop 26, and finally, the segment 74. It may or may not be tacked (see frangible tie 38, FIG. 9). The operation of this device is the same as that described above. When the parachute canopy and suspension lines have been completely deployed, the weight of the deploying system falls upon the loop 36 and it is withdrawn from the flute members 70, 72 and 74 and from the loops 26 of the static line. The canopy is thus freed from the static line. The end of the apex cable may or may not be secured as at 37 to the pack casing. As indicated above, the apex cable line is secured to the pack or left free of it depending upon whether it is desired to retain the pack with the descending parachute or allow it to jettison.

FIG. 15 shows a further modification of the locking device. In this modification, the parachute pack indicated at 80 is provided at its upper end with a single opening 82. The static line 12' is provided with one loop only, and indicated at 26'. In this modification, a securing cord 34' is attached at the apex 35' of a parachute and forms a permanent attachment between deployment pack and parachute. Secured also to the apex is a pin 36'. This pin may be a completely rigid pin made of material such as steel or it may be made of flexible material such as suitable plastic or a suitable fiber or webbing of a firm nature. The essence of the invention is retained in this modification, that is to say, the operation of the severing mechanism depends upon the complete deployment of the parachute before the pin 36' can slip out of the loop 26' and allow the parachute and pack to be freed from the static line 12'.

While the invention is shown and described in connection with one form for illustrative, rather than restrictive purposes, it is obvious that changes and modifications may be made by those skilled in the art without departing from the scope and spirit of the invention as defined in the accompanying claims.

We claim:

1. A locking device for attachment of a parachute pack and a parachute canopy to a static line and releasing said attachment when the deployment of said canopy from said pack has been completed, said device comprising a parachute pack casing, an upper end wall in said pack and integral therewith, a static line, an end loop on said static line, means on said upper end wall for releasably intruding the end loop of said static line through said end wall, a strap permanently attached at one end to the parachute pack and at the other end to the apex of a parachute, a loop of said strap being insertable through said static line end loop, the loop of said strap being detached from said end loop by the gravitational pull of said parachute and only when said parachute canopy has been completely deployed.

2. A locking device for locking a static line to the apex of a parachute, and releasing said static line from said parachute when and only when the parachute has been completely deployed from a deployment pack in which it is stowed, said locking means comprising a static line attached to an aircraft, a loop on the end of said static line, an upper end wall on said deployment pack having an opening, said loop being adapted to be inserted through said opening into the interior of said pack, flexible strap means attached to the apex of a parachute, a loop of said strap being insertable through said inserted loop of said static line to lock said deployment pack and said parachute to said static line until and only until said parachute has been completely deployed from said pack, and the weight of said parachute and the load carried thereby withdraws said flexible means from said static line loop.

3. An integrated parachute deployment pack and releasable static line lock comprising a deployment pack casing, opposite side walls and an upper end wall on said casing, said walls forming a canopy stowing compartment, means for stowing the suspension lines of a parachute, said means being located on the exterior of one side wall of said pack casing, means for stowing a static line, said means being located on the exterior of the opposite side wall of said pack casing, flaps foldable over said stowed static line, flaps foldable over said stowed suspension lines, locking means for locking said static line to the apex cable of a parachute, said means being releasable when and only when the complete deployment of the parachute contained in said canopy stowing compartment has been completed, said locking means comprising at least one opening located in the upper end wall of said deployment pack casing, at least one loop on the end of said static line, said loop being insertable through said opening, flexible means attached to the apex of said parachute, said flexible means being insertable through the intruded loop of said static line to lock said static line to said deployment pack and to said parachute until, and only until, said canopy skirt has been completely deployed from said deployment pack and its weight falls upon said flexible means.

4. An integrated parachute deployment pack and releasable static line lock comprising a deployment pack casing, opposite side walls and an upper end wall on said casing, said walls forming a canopy stowing compartment, means for stowing the suspension lines of a parachute, said means being located on the exterior of one side wall of said pack casing, means for stowing a static line located on the exterior of the opposite side wall of said deployment pack casing, flaps foldable over said stowed static line, flaps foldable over said stowed suspension lines, locking means for locking said static line to the apex cable of a parachute, said means being releasable when and only when the complete deployment of the parachute contained in said canopy stowing compartment has been completed, said locking means comprising at least one opening located in the upper end wall of said deployment pack casing, at least one fluted element located on the interior of said upper end wall and closely adjacent said openings, at least one loop on the end of said static line, said loop being insertable through said opening, flexible means attached to the apex of said parachute, said flexible means being insertable through the intruded loop of said static line and through said flute to lock said static line to said deployment pack and to said parachute until and only until said canopy skirt has been completely deployed from said deployment pack and the weight of the parachute falls upon said flexible means.

5. An integrated parachute deployment pack and static line lock and release comprising a deployment pack casing, a canopy stowing compartment within said casing, suspension line stowing flutes on the outside of one wall of said casing, static line stowing flutes on the outside of the opposite wall of said casing, flaps foldable over said static line flutes, flaps foldable over said suspension line stowing flutes, mated openings in said last named flaps, frangible ties secured to the wall of said casing and capable of being drawn through said mated openings, a back pad secured to a jumper's harness, tabs on said back pad for receiving said frangible ties for frangibly securing said back pad and harness to said deployment pack, an upper end wall on said pack, a pair of openings in said upper end wall, a fluted member on said end wall, a static line for attachment to an aircraft, a pair of loops on said static line, an apex cable secured to the apex of a parachute canopy, a folded loop on said apex cable capable of insertion through the intruded loops of said static line and through said flute for forming a locking attachment between said static line and said parachute deployment pack and said canopy apex cable, and releasing said attachment only when the deployment of said parachute canopy has been completed.

6. A locking device for securing a static line to a parachute deployment pack and to a parachute stowed therein, and releasing said static line simultaneously from said parachute and said parachute deployment pack at the time when said parachute has been completely deployed, said device comprising a pair of openings in the upper end of said deployment pack, an elongated flute on the inner surface of the upper end of said deployment pack and adjacent said openings, a static line, a pair of loops thereon insertable through said openings, an apex cable secured at one end to the apex of said parachute, a folded portion adjacent the other end of said apex cable for insertion into the inserted loops of said static line, and inserted through said elongated flute, a frangible tie frangibly securing the folded portion of said apex cable loop to the interior of said deployment pack, said tie being broken and said apex cable loop being withdrawn from said flute and said static line loops at the time of the completion of the deployment of said parachute from said parachute deployment pack, said withdrawal resulting from the weight of the parachute system imposed on said apex cable loop.

7. In a device according to claim 6, a tab attached to the interior upper end of said deployment pack, a frangible tie frangibly securing said apex cable loop to said tab.

8. A system for packing and deploying a parachute which comprises a deployment pack having an outward wall, an upper end wall and an inner wall, static line stowing flutes on the outside of said outer wall, a compartment between said outer wall and said inward wall for stowing a parachute canopy, flutes on the outside of said inner wall for receiving successive loops of the suspension lines correctly aligned and in parallel relationship, an opening in said upper end wall, end and side flaps on said inward wall foldable over said stowed suspension lines, frangible ties on said inward wall insertable through mated openings on said flaps and securing said pack frangibly to a jumper's harness, a static line, an end loop on said static line, a parachute canopy having an apex, means on said apex for securing said parachute canopy to said static line and releasing said parachute from said static line, said means operable for release only when said parachute has been completely deployed, and only by the gravitational pull of said parachute canopy on said means.

9. A parachute pack unit for stowing and deploying a parachute comprising a deployment pack casing, a compartment for stowing of a parachute canopy, flutes on the interior of said compartment for receiving the successive loops of the massed and parallel suspension lines, side flaps and a lower end flap, said side and end flaps being provided with openings capable of forming mated pairs when said side and end flaps are folded over said suspension lines, frangible ties secured to the interior surface of said pack casing, a jumper's back pad attachable to a jumper's harness, loops on said back pad, said frangible ties being adapted to be carried through said mated openings and tied to said tab loops for frangibly securing said deployment pack to said jumper's harness, a static line, a pair of looped ends on said static line, an upper end portion on said parachute pack provided with a pair of openings for receiving said looped ends, an elongated flute adjacent said openings for receiving a folded section of the apex line of the parachute.

References Cited in the file of this patent

UNITED STATES PATENTS

| | | |
|---|---|---|
| 2,251,418 | Pavlik | Aug. 5, 1941 |
| 2,369,458 | Hart | Feb. 13, 1945 |
| 2,439,318 | Quilter | Apr. 6, 1948 |
| 2,760,741 | Tauty | Aug. 28, 1956 |

FOREIGN PATENTS

| | | |
|---|---|---|
| 40,018 | France | Dec. 28, 1931 |
| 1,044,509 | France | June 17, 1953 |
| 1,148,890 | France | July 1, 1957 |